(12) United States Patent
Buch

(10) Patent No.: US 6,288,860 B1
(45) Date of Patent: Sep. 11, 2001

(54) SERVO AREA NUMBERING STRATEGY FOR COMPUTER DISK DRIVES

(75) Inventor: Bruce Buch, Westboro, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/225,256

(22) Filed: Jan. 4, 1999

(51) Int. Cl.$^7$ ................................ G11B 5/09; G11B 5/596
(52) U.S. Cl. ........................... 360/48; 360/49; 360/78.14
(58) Field of Search ........................... 360/48, 75, 78.14, 360/78.04, 49

(56) References Cited

U.S. PATENT DOCUMENTS 5,253,131 * 10/1993 Chevalier .......................... 360/78.14
5,862,005 * 1/1999 Leis et al. .............................. 360/27

* cited by examiner

*Primary Examiner*—Regina Y. Neal
(74) *Attorney, Agent, or Firm*—Fish & Richardson P.C.

(57) ABSTRACT

A disk for a disk drive system includes a disk having a track format region including a spoke field region. The spoke field region has a single binary bit to identify angular position of a track with respect to disk head of the disk drive system.

13 Claims, 9 Drawing Sheets

SERVO AREA NUMBERING STRATEGY FOR COMPUTER DISK DRIVES

BACKGROUND

This invention relates generally to track formats for computer disk drives.

Disk drive systems store data magnetically, often in multiple disks each having two storage surfaces. Bytes of information are stored on these surfaces as binary ones and zeros. In order to efficiently store and retrieve bytes of information stored on such disks, disk drive controllers need to know locations on the disk where to write data to and read data from the disk. Each location on a disk is identified, therefore, by short segments of site information stored at various locations on the disk surface. Using this site information, the disk drive can accurately store data to, and retrieve data from, desired locations on the disk surfaces.

Data are stored in multiple concentric circular tracks on one or more surfaces of the disk. On each track are spoke areas separated by user data areas. The spoke areas generally include a spoke number field to discriminate one spoke on a track from another. The information in the spoke number field is used to establish a position of the disk relative to magnetic heads in the disk drive that are used to read and write the disk surface. Techniques which have been used to produce a spoke number include providing a whole spoke number in each spoke field to provide a straightforward technique to identify angular position anywhere on the track. Another technique uses a portion of the full spoke number, such as an N number of LSB's of the spoke number, in each spoke field. This arrangement also requires that certain spoke fields have a uniquely formatted index spoke in order to fully identify the position of any spoke field when angular position context is lost in the disk drive. The provision of uniquely formatted index spokes are needed since using an N number of bits in the spoke field will result in an ambiguous identification of a spoke beyond a range of $2^n$ spokes.

SUMMARY

According to an aspect of the invention, a disk for a disk drive system includes a disk having a track format region including a spoke field region, said spoke field region having a single binary bit to identify angular position of a track with respect to disk head of the disk drive system.

According to an additional aspect of the invention, a disk drive system includes a disk drive and a disk operatively associated with the disk drive, said disk having a plurality of track format regions, each track format region including a spoke field region, said spoke field region having a single binary bit to identify angular position of a track on the disk with respect to the at least one disk head of the disk drive system.

According to a still further aspect of the invention, a servowriter for a disk drive includes a pseudorandom sequence generator to produce a single binary bit of a spoke field region for each of a plurality of track format regions of a disk.

According to a still further aspect of the invention, a method of writing servo areas of a track format includes generating a pseudorandom sequence of vectors and writing the LSB of each vector of the pseudorandom sequence to corresponding spoke number fields of the disk.

One or more advantage may be provided by the invention. The single bit spoke number field 50d is a single bit field which is used to provide an unambiguous identification of angular position. The single bit spoke number field can provide the functions of the conventional spoke number field and the conventional head/surface field with a single bit. The single bit spoke number field uses a single bit to represent the angular position of the disk surface relative to the disk heads. Each of the spoke number fields is populated with a single bit that assumes a binary value of 0 or 1. Each spoke bit is generated in a specified manner such that a complete spoke number identification is obtained from reading a few consecutive spoke numbers anywhere on a track.

DETAILED DESCRIPTION

Figure 1:
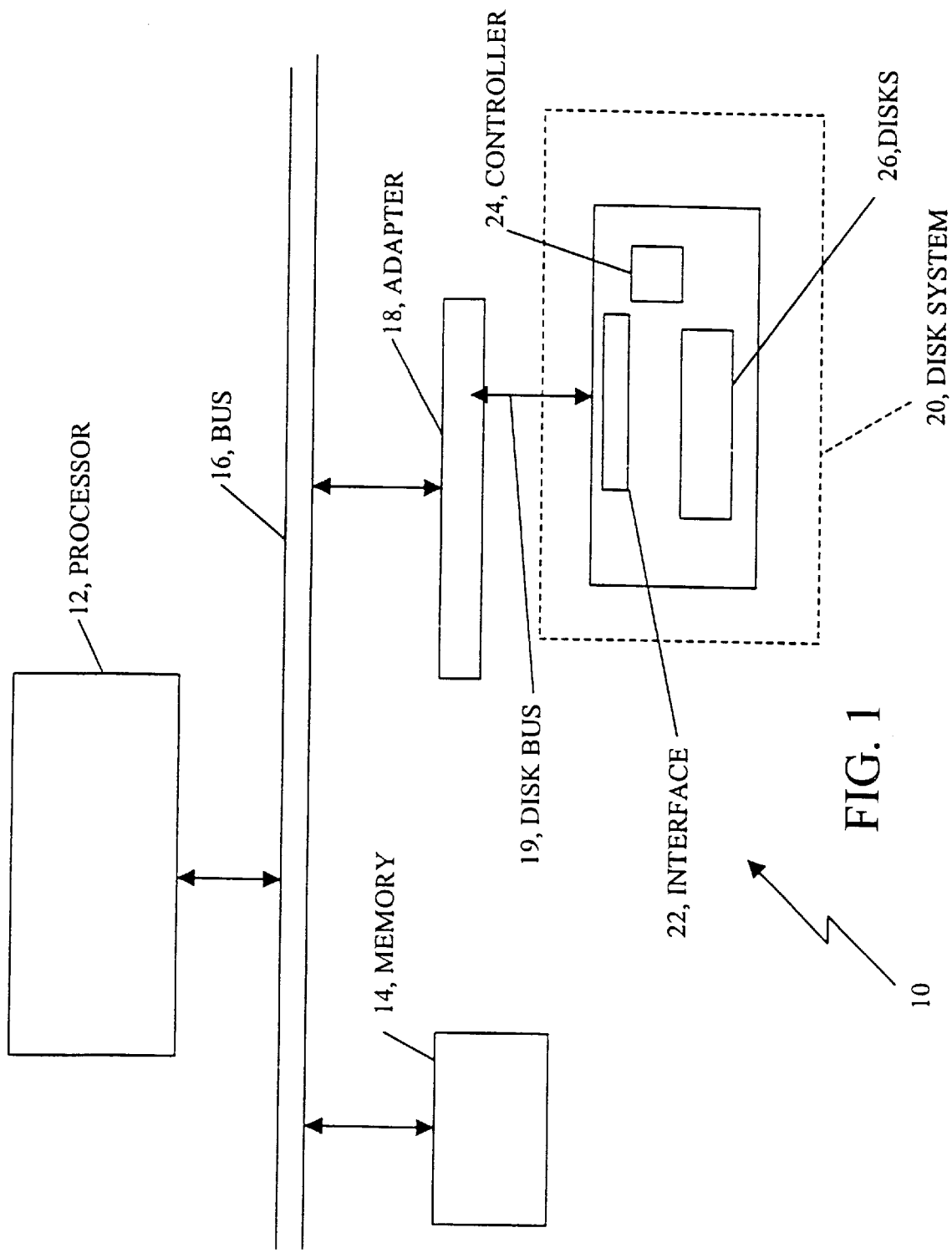
FIG. 1 is a block diagram of a computer system including a disk drive.

Referring now to FIG. 1, a computer system 10 includes a processor 12, a main memory 14 and a magnetic storage subsystem such as a disk drive system 20 all coupled via a system bus 16. A bus adapter 18 couples a storage bus 19 to the system bus 16. The disk drive system 20 includes at least one magnetic disk 26. In addition, the disk drive system 20 includes a bus interface circuit 22 and a disk controller 24.

Figure 2A:
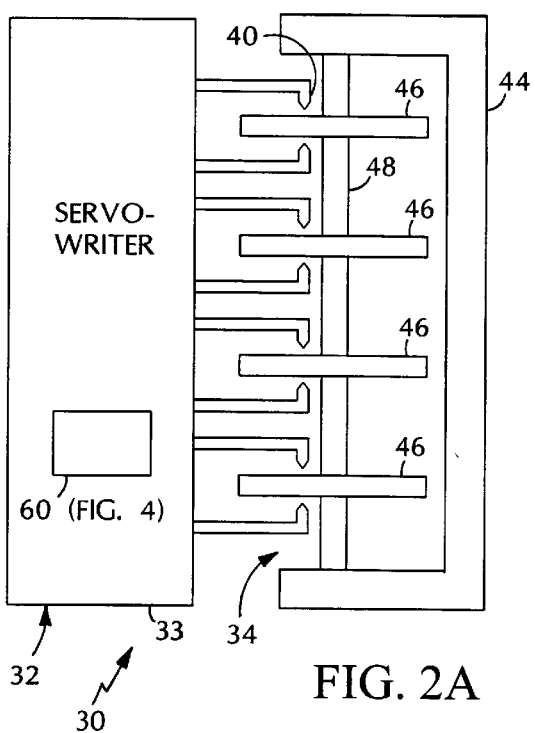
FIGS. 2A, 2B are block diagrams of a servo writer for formatting a disk and a disk drive that performs formatting of a disk in the disk drive.
Figure 2B:
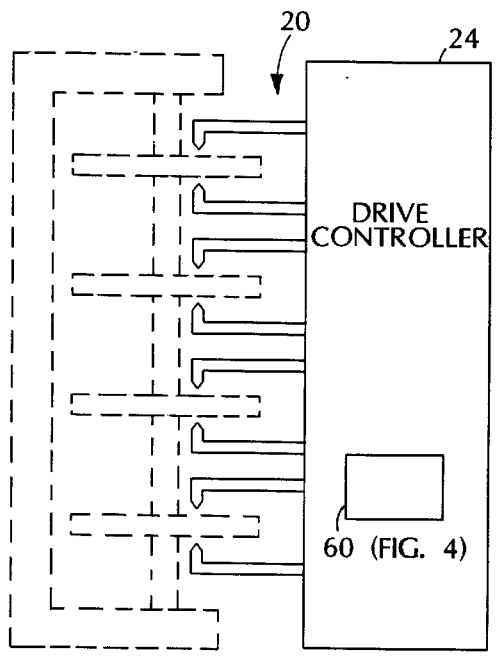

Referring now to FIGS. 2A and 2B, a system 30 for reading and writing data to magnetic storage disks includes a servo writer 32. The servo writer 32 operates a disk stack 34 to format the disk during a manufacturing operation. Alternatively, this formatting can be done by the disk drive system 20 itself as shown in FIG. 2B. The servo writer 32 includes a servo controller 33 and a plurality of heads 40. The heads 40 are configured to magnetically store information on concentric tracks disposed on surfaces of disks 46 on disk stack 34. The servo controller 33 sends signals through conductors to a disk motor 44 to control rotation of the disk stack 36 and the servo controller 33 positions heads 40 so as to permit heads 40 to read data from or write data to desired tracks on the surfaces of the disks 46. The rotation of disks 46 is controlled by a central spindle 48 in accordance with the disk motor 44. The servo controller 33 also includes a subsystem 60 (FIG. 4) that produces a pseudorandom sequence that can be used to produce single bits for spoke number fields that can uniquely identify angular positions of the disk 46.

Figure 2C:
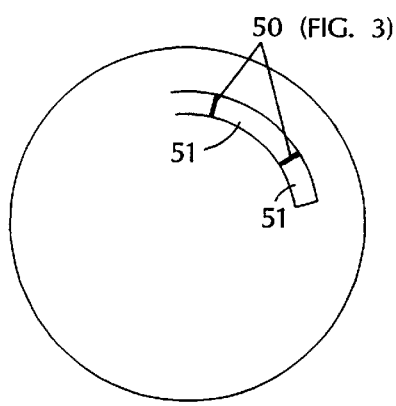
FIG. 2C is a diagrammatical view of a disk having track format sectors or spokes.

Referring now to FIG. 2C, spokes 50 are shown distributed across tracks of the disk 46 and in general would be included over both surfaces 46' of the disks 46. The spokes 50 have the general format as will be described in conjunction with FIG. 3 and are interspersed between user or data areas 51 on the disk 46.

Figure 3:
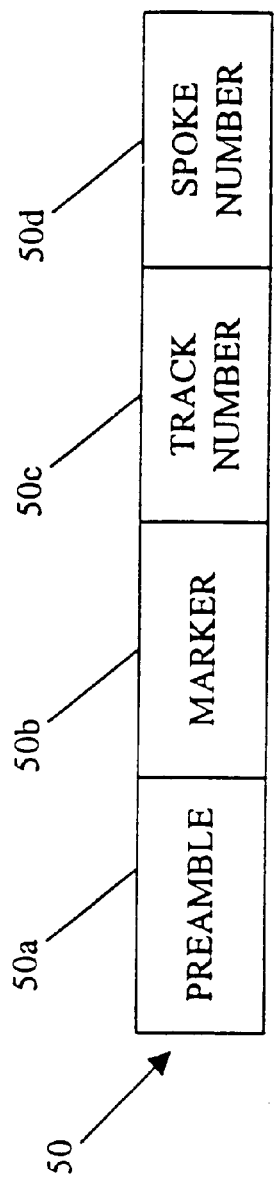
FIG. 3 is a representation of a format for servo areas of tracks for the disk of FIG. 2A including a spoke number field.

Referring now to FIG. 3, exemplary information stored in spokes 50 may include a preamble field 50a, a marker field 50b, a track number field 50c, a spoke number field 50d, and a head surface field 50e. The preamble field 50a typically includes bits for timing acquisition of the disk drive 14 during normal operation, whereas the marker field 50b identifies the start of a field. The track number field 50c identifies the track number. The single bit spoke number field 50d is a single bit field which is used to provide an unambiguous identification of angular position in a manner to be described.

A conventional spoke number field has a number with enough bits to uniquely label each spoke on a track, or in a large portion of a track. Conventionally, a head/surface number field labels each surface with a unique number. That is, the spokes on a given surface have the same number in their head/surface field, which differs from the number in the head/surface field of all spokes of another surface. This is used to confirm that the disk head is actually reading or writing the intended surface. The single bit spoke number field 50d provides the functions of the conventional spoke number field and the conventional head/surface field with a single bit.

The single bit spoke number field 50d uses a single bit to represent the angular position of the disk surface relative to the disk heads. Each of the spoke number fields 50d throughout each disk surface is populated with a single bit that assumes a binary value of 0 or 1. Each spoke bit is generated in a specified manner such that a complete spoke number identification is obtained from reading a few consecutive spoke numbers anywhere on a track.

Figure 4:
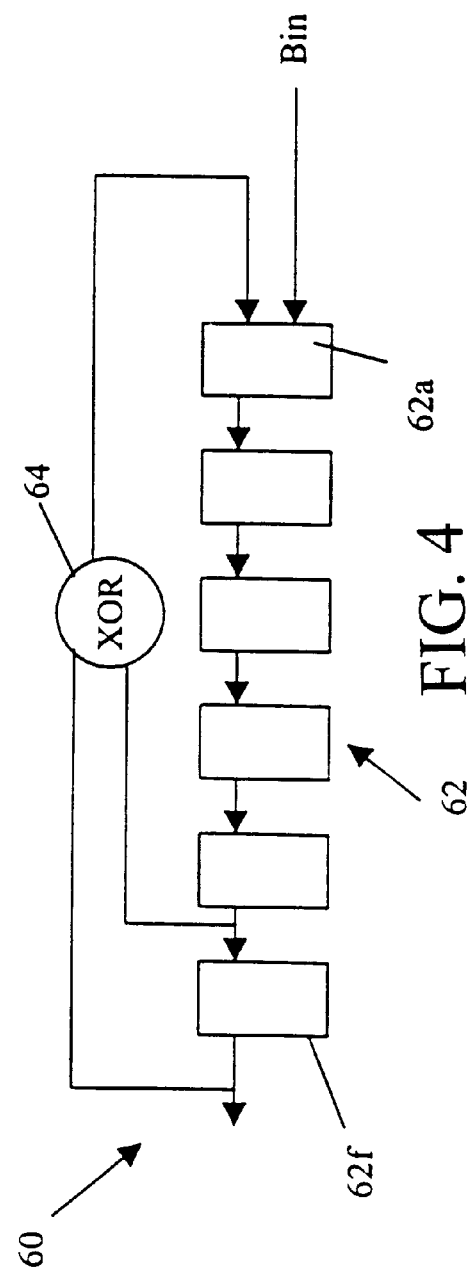
FIG. 4 is a block diagram of a 6-bit pseudorandom sequence generator.
Figure 10:
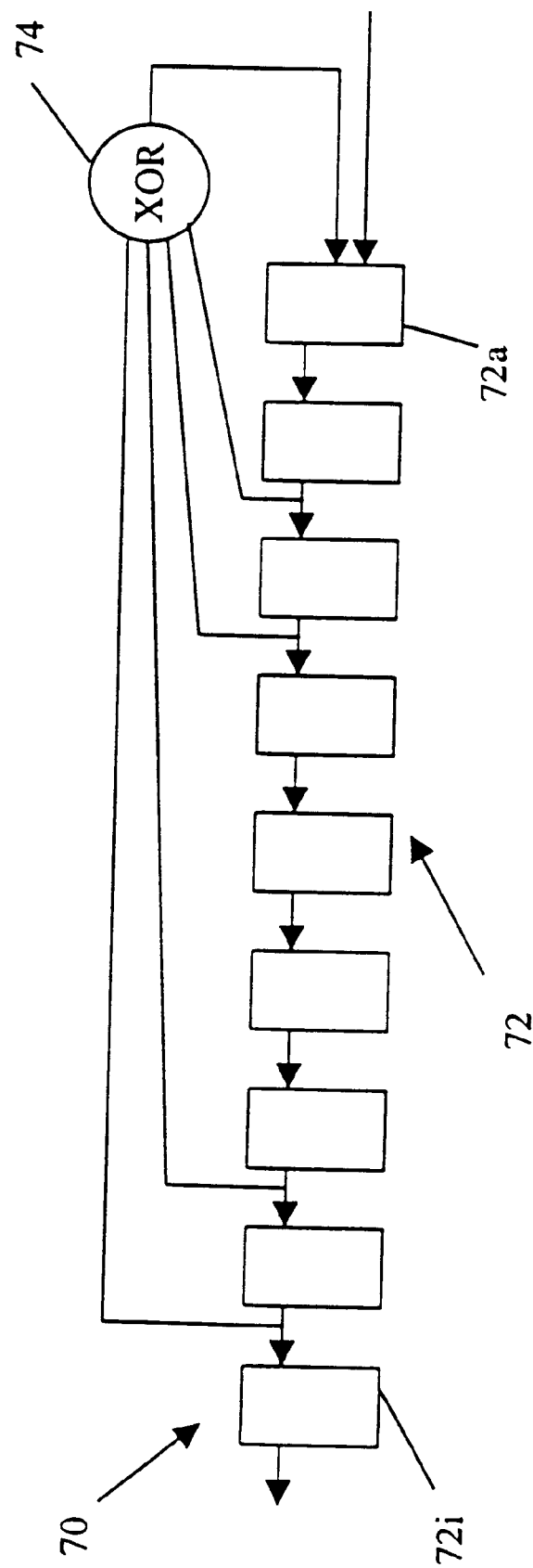
FIG. 10 is a block diagram of an 8-bit pseudorandom sequence generator.

Referring now to FIG. 4, the subsystem 48 includes a pseudorandom sequence generator 60 that is 6-bits in length. In a typical disk drive implementation, an 8 bit (or larger) pseudorandom sequence generator such as shown in FIG. 10 may be used since it has more states than the 6-bit generator shown in FIG. 4. An example using the 6-bit generator 60 (FIG. 4) is described, in order to simplify discussion of the concept. Alternatively, the pseudorandom sequence generator 60 could be part of the disk drive controller 24 (FIG. 1).

The 6-bit generator 60 includes flip-flops 62a–62f, arranged as a shift register 62. Flip-flops 62a–62i correspond to bits B0–B5 of shift register 62, respectively. The pseudorandom sequence generator 60 also includes an "exclusive OR" gate 64 that is coupled to outputs of the last two stages 62e–62f of shift register 62. The "exclusive OR" of these last two stages is fed back to the input of the shift register at stage 62a. In this manner, this pseudorandom sequence generator 60 provides a so-called "linear feedback shift register" that produces a random sequence that is cyclic in nature. There a forbidden state all 0's for the LFSR 60. An LFSR initialized to all 0's will stay at all 0's. A signal bit can be used to force a logic "1" into the LFSR 60 on start-up to avoid the forbidden state. Other techniques to avoid the forbidden state are possible. For most selections of feedback taps, starting with any value that it not all 0's will result in a cyclic sequence that does not include the all 0's vector.

The 6-bit pseudorandom sequence generator 60 generates a sequence of pseudorandom vectors (PRV), as set forth below in Table 1.

TABLE 1

| Cycle 1 | PR vector | Cycle # | PR vector | Cycle # | PR vector | Cycle # | PR vector | Cycle # | PR vector |
|---|---|---|---|---|---|---|---|---|---|
| 0 | 1 | 13 | 10 | 26 | 7 | 39 | 55 | 52 | 21 |
| 1 | 2 | 14 | 20 | 27 | 14 | 40 | 46 | 53 | 43 |
| 2 | 4 | 15 | 41 | 28 | 28 | 41 | 29 | 54 | 23 |
| 3 | 8 | 16 | 19 | 29 | 57 | 42 | 59 | 55 | 47 |
| 4 | 16 | 17 | 39 | 30 | 50 | 43 | 54 | 56 | 31 |
| 5 | 33 | 18 | 15 | 31 | 36 | 44 | 44 | 57 | 63 |
| 6 | 3 | 19 | 30 | 32 | 9 | 45 | 25 | 58 | 62 |
| 7 | 6 | 20 | 61 | 33 | 18 | 48 | 51 | 59 | 60 |
| 8 | 12 | 21 | 58 | 34 | 37 | 47 | 38 | 60 | 56 |
| 9 | 24 | 22 | 52 | 35 | 11 | 48 | 13 | 61 | 48 |
| 10 | 49 | 23 | 40 | 36 | 22 | 49 | 26 | 62 | 32 |
| 11 | 34 | 24 | 17 | 37 | 45 | 50 | 53 | 0 | 1 |
| 12 | 5 | 25 | 35 | 38 | 27 | 51 | 42 | (repeats) | |

This pseudorandom sequence has two properties that are desirable for generating a bit for each spoke number field 50d. The first property is that the vectors in the sequence are unique within the period of the generator 60. That is, the generator 60 is cyclic, having a cycle repeat every 63 cycles, with the pseudorandom sequence vector "0" not used. In addition, the sequence has the property that bit (0) of vector N becomes bit (1) of vector N+1 and becomes bit (2) of vector N+2 and so forth. Thus, each N-bit vector can be completely constructed from the least significant bits of the N−1 previous inclusive vectors, along with the LSB of vector N. For the 6-bit pseudorandom sequence provided by pseudorandom sequence generator 60, any vector in the sequence can be assembled by selecting the LSB of the vector and the LSB's of the five previous vectors.

Figure 5:
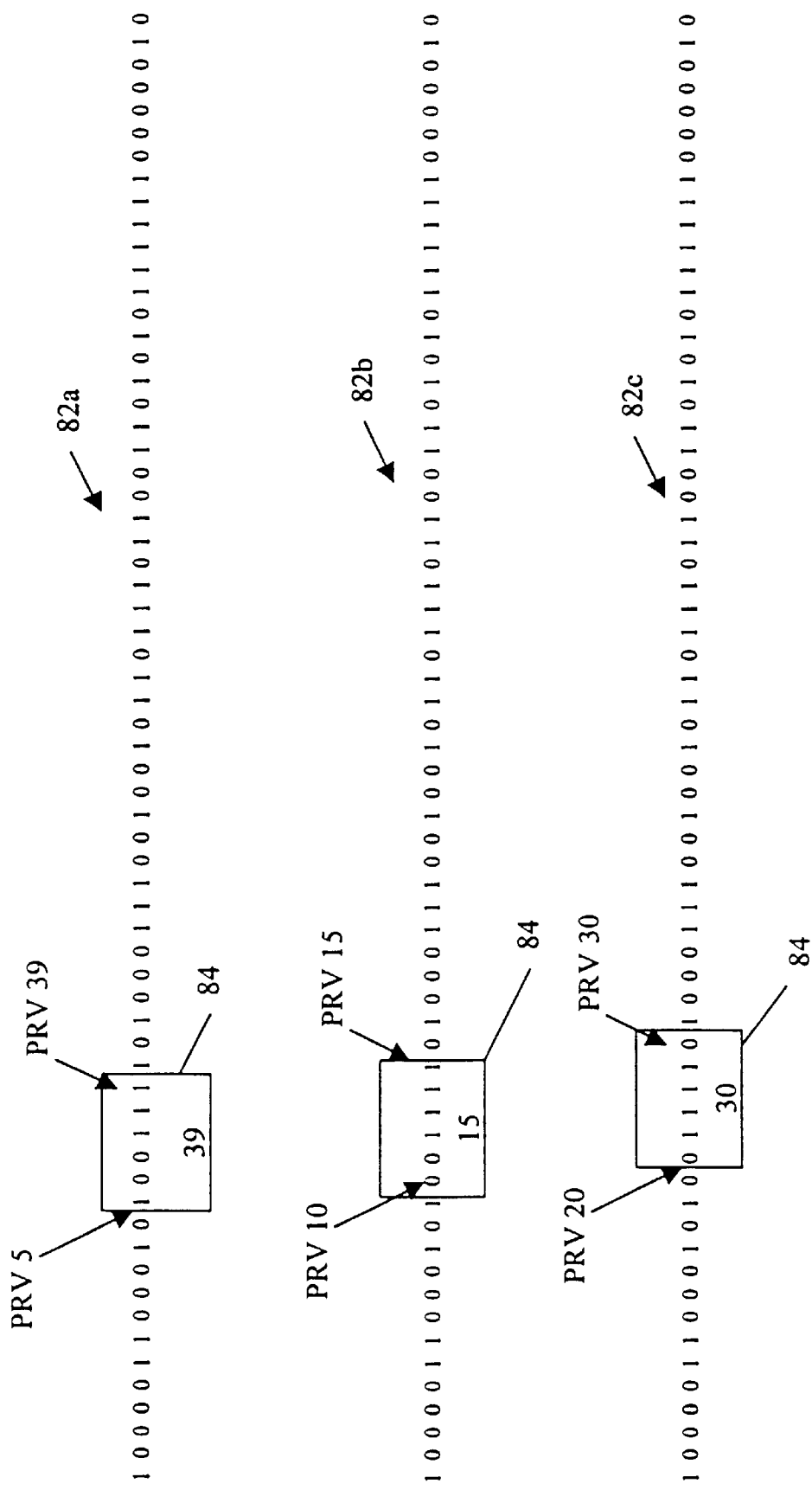
FIG. 5 is a diagram showing a relationship of pseudorandom sequences for producing successive spoke identification bits.

Referring now to FIG. 5, three strings 82a–82c each comprised of all of the LSB's of each of the vectors for the sequence generated in Table 1 are shown. The first string 82a has the LSB's of the pseudorandom vectors listed in the same order as the pseudorandom vectors appear in Table I. Similarly, strings 82b and 82c depict the same sequence as string 82a. Strings 82a–82c show that the n previous bits can be used to produce one of the pseudorandom vectors corresponding to a cycle in Table I. Strings 82a–82c depict 3 examples via a window 84 that is slid across the bits. Thus, for example, considering string 82a, window 84 encompasses bits (1, 0, 0, 1, 1, 1) which correspond to the LBS's of the pseudorandom vectors 5, 10, 20, 41, 19 and 39 (cycles 12–17). The value of these bits (100111) is the pseudorandom vector 39, i.e., cycle 17. Thus, with the present LSB "1" of the pseudorandom vector 39, the complete vector can be constructed by taking the LSB's (10011) of the five previous vectors. Similar considerations apply to strings 82b and 82c in which the LSB's from the pseudorandom vectors 10, 20, 41, 19, 39 and 15 (cycles 13–18) are assembled to provide the pseudorandom vector 15 i.e., cycle 18, as well as the LSB's from pseudorandom vectors 20, 41, 19, 39, 15 and 30 (cycles 14–19) are used to provide the pseudorandom vector 30 (cycle 19), as shown in string 82c.

Accordingly, with the above in mind, each successive spoke 50 on the disk 46 is associated with a single bit spoke ID field 50d that represents a vector from the pseudorandom sequence given in Table I or as appropriate from a corresponding table produced from a larger pseudorandom sequence generator such as will be described in FIG. 10. The LSB of the spoke ID, however, is the only bit that needs to be recorded in the spoke field 50d. For example, using the sequence in Table I, spoke 10 has a spoke ID of 49, and a value of 1 (the LSB of 49) is recorded in the single bit spoke field 50d corresponding to spoke 10. The disk controller 24 can include the circuits of FIGS. 6–8.

Figure 6:
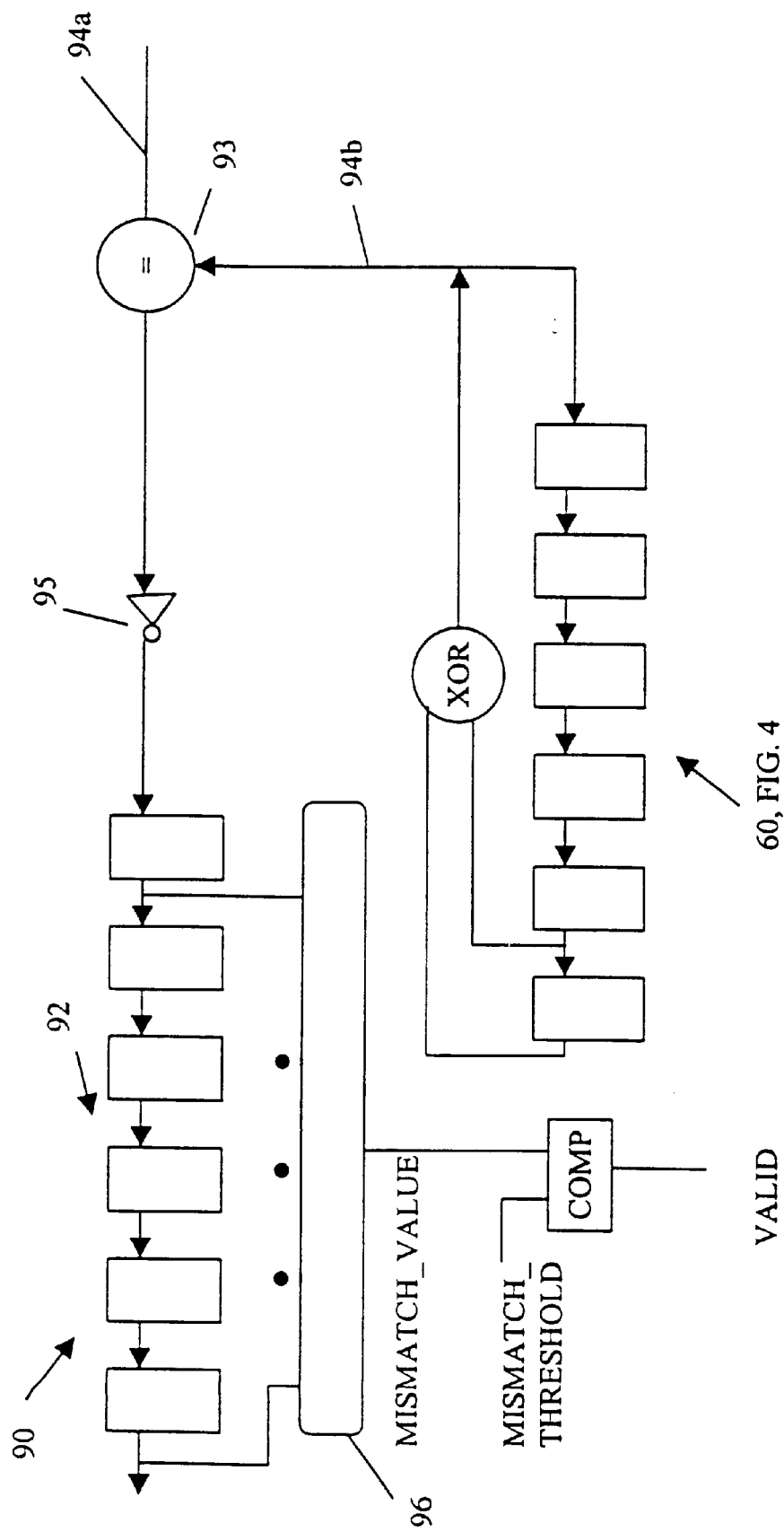
FIG. 6 is a block diagram of a verification circuit.

Referring now to FIG. 6, a verification circuit 90 that verifies spoke IDs read from the spoke number field 50d includes the pseudorandom sequence generator 60 (FIG. 4) and a match history shift register 92. The match history shift register receives complemented input bits provided from a comparator gate 93 and inverter 95. The comparator gate 93 compares whether the bit from a spoke field provided via line 94a is the same as the bit from the pseudorandom sequence generator provided via the output of the exclusive OR gate 64 via line 94b. This comparator gate 93 is typically implemented as "an exclusive NOR" gate. The complement of the bit from the output of gate 93 is fed to the match history shift register 92 and the outputs of the match history shift register are fed to a summing circuit 96. Summing circuit 96 produces a value on lines "MISMATCH_VALUE" which is the sum of the number of ones on its output. "MISMATCH_VALUE" is compared via magnitude comparator 97 to a threshold value "MISMATCH_THRESHOLD". The threshold signal "MISMATCH_THRESHOLD" can be preloaded by a driver (not shown). The match history shift register 92 permits an implementation of an error tolerant verification scheme by keeping match results of the last M spokes and summing the number of mismatches thus permitting thresholding of the number of mismatches over a window. This circuit is used to confirm that the spoke ID being generated by the circuit of FIG. 8 is indeed in sync with the spokes on the disk, and in turn indicates that the binary counter of FIG. 8 is thus also in sync with the spokes.

Figure 7:
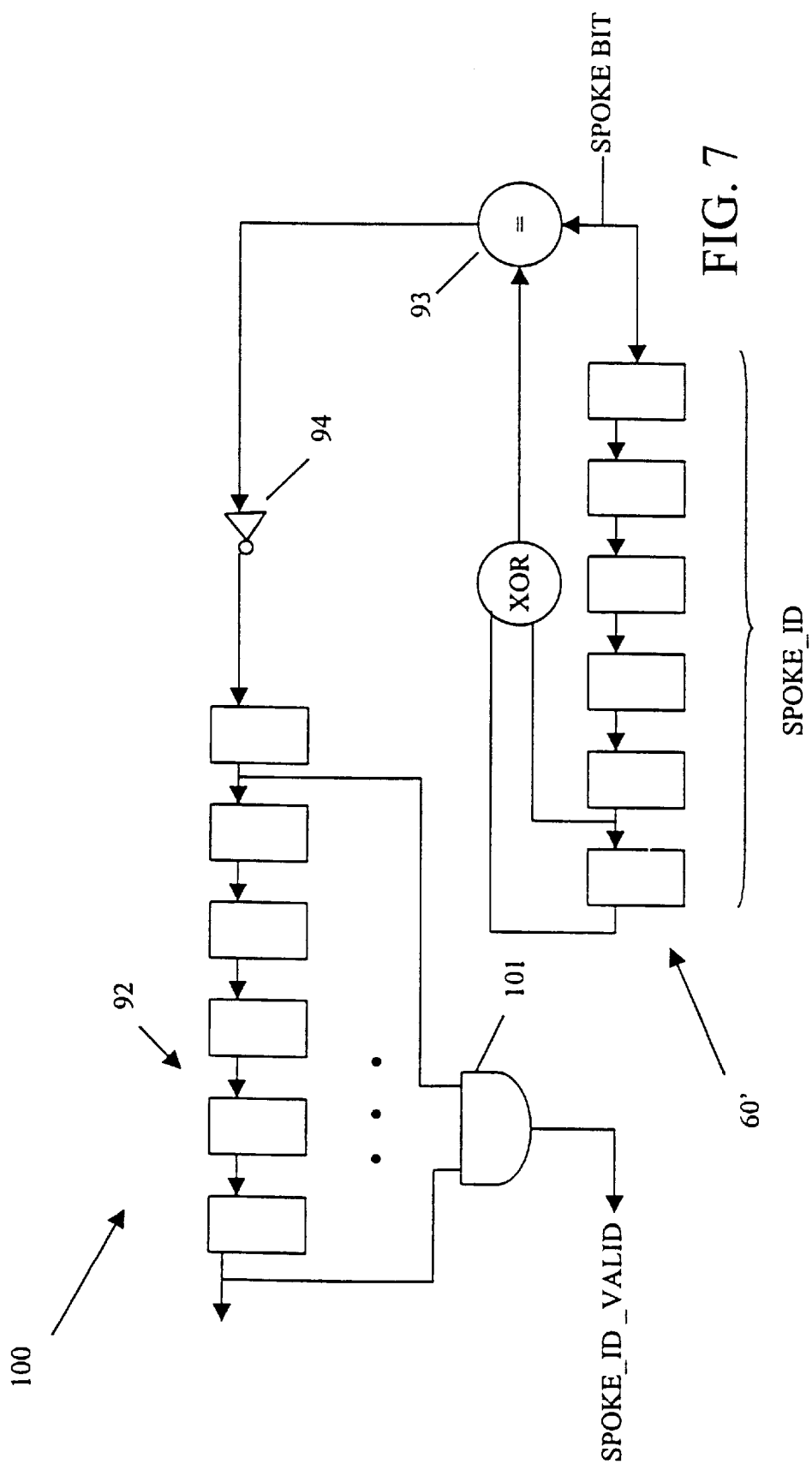
FIG. 7 is a block diagram of a spoke identification generator.

Referring now to FIG. 7, a spoke identification circuit 100 includes a modified pseudorandom sequence generator 60' and the match history shift register 92, compare gate 93 and inverter 94 of FIG. 7, and also includes an AND gate 101 fed by the outputs of the match history shift register 92 to produce a "SPOKE_ID_VALID" signal at the output of gate 101. The above verification circuit 90 (FIG. 7) presumes that the spoke logic has gained some prior context as to what spoke ID to expect. The identification circuit 100 develops this context for spoke verification. That is, the identification circuit 100 discerns a spoke's spoke ID when there is no running ID sequence from which to form an expected match. This sequence is used when first spinning up a drive or when a drive is lost and needs to reestablish its angular position. The arrangement shifts each successive spoke ID LSB read from the spoke field 50d into the modified the pseudorandom sequence generator 60'. The pseudorandom sequence generator 60' is slightly modified to function as a checker, as illustrated. The modified pseudorandom sequence generator 60' also receives the bit from the spoke field 50d and shifts that bit through the shift register 72. The appropriate bits are exclusive OR'ed and fed back to generate the next expected bit in the pseudorandom sequence given the state of the previous N shifts. The exclusive OR of these bits is compared to the bit expected from the spoke field several stages removed. When the bits are equal, the gate 93 produces a match that is fed to the match history shift register. When the match history shift register contains N consecutive bits in the match state SPOKE_ID_VALID is asserted and, the N bit checker 70' contains a SPOKE_ID of the current spoke. This is essentially a test to determine if consecutive subfields formed from the consecutive spoke field bits match the pseudorandom sequence. Since a vector of any consecutive bits collected anywhere from the pseudorandom sequence is unique within that sequence, the SPOKE_ID_VALID signal is unambiguous, obviating the need to wait for an index spoke to establish a position reference. The level of confidence can be arbitrarily augmented by increasing the number of consecutive bits checked in the match history field before having the SPOKE_ID_VALID signal asserted.

Figure 8:
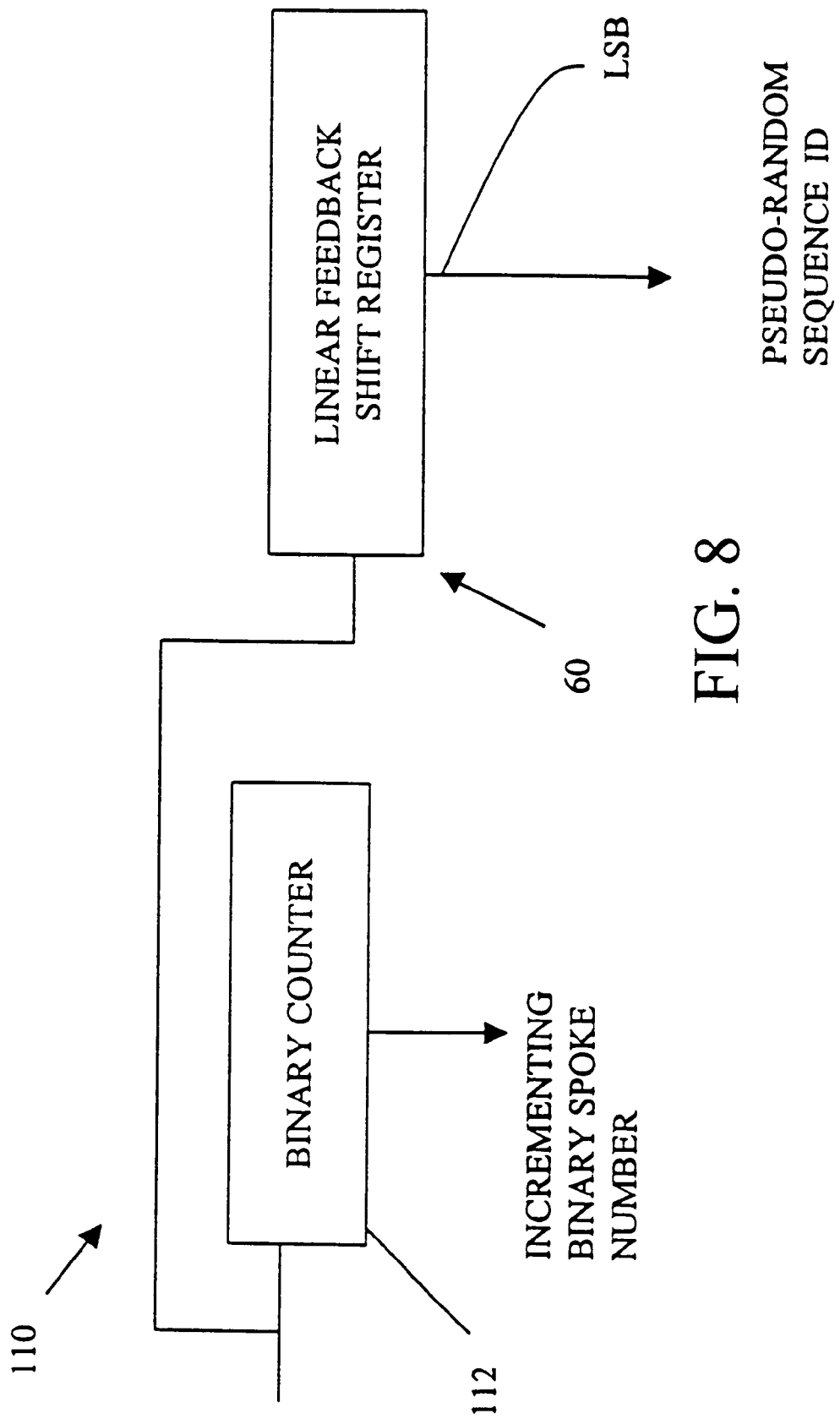
FIG. 8 is a block diagram of a spoke number generator.

Referring now to FIG. 8, a spoke number generator 110 is shown. The spoke number generator 110 includes a linear feedback shift register 60 and as well as a binary counter 112. The output of the linear feedback sequence register 60 is fed to the binary counter 112 to advance or reset the counter 112 in accordance with the output bit from the linear feedback shift register 72. Maintaining the state of the counter 112 and the linear feedback shift register 72 is straightforward for the verification strategy once the counter 112 and linear feedback shift register are brought to a consistent state. For the identification strategy, the spoke ID is mapped to an associated binary count. A sufficient solution is to fast-forward the counter 112 and the linear feedback shift register 72 pair until the linear feedback shift register 72 matches the spoke ID established by the identification process.

The circuits of FIGS. 6–8 can be used to provide verification, identification and numbering strategies for systems using the single bit spoke identification. The identification circuit 100 (FIG. 7) is used by the disk to establish its initial position. By looking at the first several bits, the identification circuit 100 can determine the spoke or position of the heads. Once the identification circuit 100 has determined spoke or position, the verification circuit 90 FIG. 6 can be used to test the accuracy of the generated bit patterns read from the spoke fields. This allows for bit errors by having the verification circuit 90 allow for occasional mismatching of the bit read from the field with an expected bit. The spoke number generator circuit 110 can generate sequential numbers for circuits that need a numeric spoke identifier that directly indicates the order in which they occur on the track.

Although the pseudorandom sequence generator described above is cyclic, repeating after a particular number of cycles, a preferable spoke numbering strategy should provide for a repeat in the pseudorandom sequence after a chosen number of spokes per track or a chosen number of cycles. The technique for resetting the linear feedback shift register to a starting vector after arriving at a value for the last spoke is straightforward for the verification process. However, a complication exists in identification process since the identification process uses a concatenation of the last N-bits read from a spoke as the spoke identification. This process, therefore, may not assemble a valid pseudorandom sequence vector over N-bits after resetting to a starting vector because, during resetting, the shift register containing the bits contains a mix of bits that exists before the resetting operation and after the sequence has been broken by the resetting operation. This is shown by the example as set forth in FIG. 9.

Figure 9:
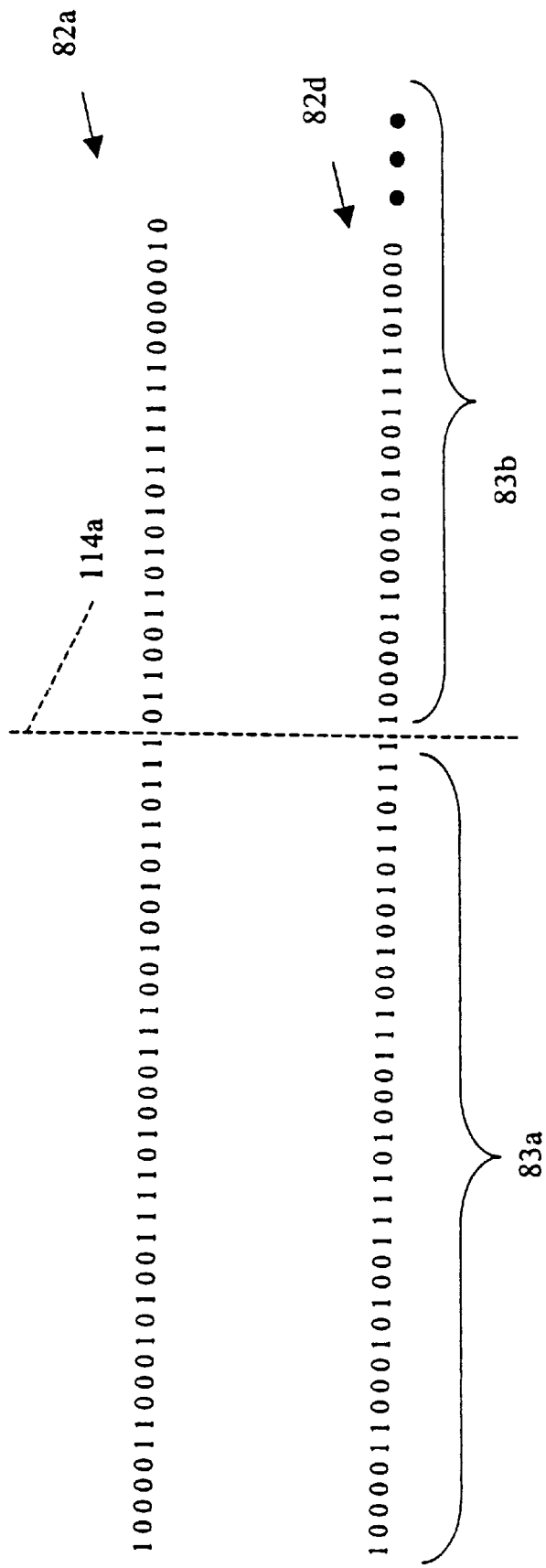
FIG. 9 is a diagram of pseudorandom sequences useful in understanding a technique for establishing an arbitrary restart of the sequence.

FIG. 9 shows the pseudorandom sequence, e.g., 82a, with a track length 83a depicted in sequence 82d. The sequence is restarted at the boundary 114a, as shown in sequence 82d, repeating an initial portion 83b of the original sequence 82a. Table 2 below shows values that result from shifting the bits on this sequence into the 6-bit shift register of the pseudorandom sequence generator 60 (FIG. 4).

TABLE 2

| Spoke Number | Correct PRS Vector | Bit read from format | Vector assembled from last 6 spoke bits |
|---|---|---|---|
| : | : | : | : |
| 30 | 50 | 0 | 50 |
| 31 | 36 | 0 | 36 |
| 32 | 9 | 1 | 9 |
| 33 | 18 | 0 | 18 |
| 34 | 37 | 1 | 37 |
| 35 | 11 | 1 | 11 |
| 36 | 22 | 0 | 22 |
| 37 | 45 | 1 | 45 |
| 38 | 27 | 1 | 27 |
| 39 | 55 | 1 | 55 |
| 0 | 1 | 1 | 47 |
| 1 | 2 | 0 | 30 |
| 2 | 4 | 0 | 60 |
| 3 | 8 | 0 | 56 |
| 4 | 16 | 0 | 48 |
| 5 | 33 | 1 | 33 |
| 6 | 3 | 1 | 3 |
| 7 | 6 | 0 | 6 |
| 8 | 12 | 0 | 12 |
| : | : | : | : |

As the window 84 spans the point where the sequence is reset going from the last spoke 39 to the first spoke 0 (see sequence 82a FIG. 9), the values in the 6-bit register disagree with the values generated by the pseudorandom sequence generator 60 (FIG. 4). In this particular example, most of the inconsistent reassembled vectors (denoted in bold in TABLE 2) exist nowhere else in the sequence. However, the ID "30" of "spoke 1" (TABLE 2) properly corresponds to "spoke 19" not "spoke 1" (see TABLE 1). In general, the IDs assembled in this region where the sequence is broken could be ambiguous to other regions. The spoke identification circuit 100 (FIG. 7) could mistakenly identify the wrong spoke position.

This potential error can be obviated with a simple approach. Since the pseudorandom sequence is cyclic, the pseudorandom sequence can be chosen for an arbitrary starting ID for spoke 0. This starting point can be chosen so that the maximum number of consecutive 1's in the sequence occurs at the start of the track. The identification circuit 100 (FIG. 7) would be augmented by delaying the use of any spoke ID assembled by the shift register 92 (FIG. 7) until a 0 has been shifted into the shift register. This would guarantee that a spoke ID that is assembled across the reset point would be ignored until such a 0 has been shifted in. At other points in the track, this would only delay the identification by a small number of strokes since, in general, the run length of 0's is small in the pseudorandom sequence.

Referring now to FIG. 10, an 8-bit implementation 70 of the pseudorandom sequence generator includes flip-flops 72a–72h corresponding to bits B0–B7 and an exclusive OR gate 74 which has inputs coupled to the outputs of stages of the flip-flops to produce an output that is fed back to stage 72a.

For the 8-bit pseudorandom sequence generator 70, any vector in the pseudorandom sequence generated by the 8-bit pseudorandom sequence generator 70 can be assembled from the LSB of the vector and the LSB's of the seven (7) preceding vectors. This principle can be extended to any N-bit pseudorandom sequence that is generated having the properties set forth above.

The 8-bit pseudorandom sequence generator 70 may be more suited to a realistic implementation than the 6-bit generator 60 (FIG. 4). There are many choices of the pseudorandom sequence generator 70 which can be provided for 8-bits for a practical implementation. One such pseudorandom sequence generator has bits 1, 2, 3 and 7 of the shift register 72 fed back to the exclusive OR gate 74. This sequence generator produces a maximal sequence length which repeats after 255 vectors. The starting vector for this sequence would start at vector 65h (101 decimal), yielding a sequence of single spoke LSB's with the following characteristics: With this sequence there would be consecutive 1's in the first 6 spokes and the maximum length of 1's elsewhere would be 5 for tracks of 200 spokes or less. This property is useful in the spoke identification circuit since the spoke ID circuit would wait for the arrival of a 0 before declaring an identification valid. This also guarantees that the identification is disabled for a needed period of 6 strokes after the track repeats even though the spoke IDs are 8 bits, and insures that there is not an unnecessary weight of more than 5 spokes elsewhere. With this sequence, the maximum run length of 0's is 5 per track length up to 152 spokes and 6 per track length up to 178 spokes.

Although hardware implementations of the invention have been described, it is to be understood that the invention may be implemented in hardware, firmware, software or combinations thereof.

OTHER EMBODIMENTS

It is to be understood that while the invention has been described in conjunction with the detailed description thereof, the foregoing description is intended to illustrate and not limit the scope of the invention which is defined by the scope of the appended claims. Other aspects, advantages and modifications are within the scope of the following claims.

What is claimed is:

1. A disk for a disk drive system comprising:
    a disk having spoke field regions to identify angular position of a track with respect to a disk head of the disk drive; and
    wherein each spoke field region comprises the least significant bit (LSB) of a generated vector in a pseudorandom sequence of generated vectors.

2. The disk of claim 1 wherein the disk has a pair of surfaces with each surface having a plurality of said spoke field regions.

3. The disk of claim 2 wherein the plurality of spoke field regions are LSB's of a pseudorandom sequence of generated vectors.

4. The disk of claim 2 wherein the pseudorandom sequence of generated vectors is a complete cyclic pseudorandom sequence of generated vectors.

5. The disk of claim 3 wherein the pseudorandom sequence of generated vectors is an interrupted pseudorandom sequence of generated vectors.

6. A disk drive system system comprising:

a disk drive;

a disk operatively associated with the disk drive, said disk having a plurality of track format regions for a track and each track format region including a spoke field region having a single binary bit to identify angular position of a track on the disk with respect to at least one disk head of the disk drive system; and a spoke identification circuit to generate a spoke ID from a sequence of bits provided from the spoke field region of sequential ones of the plurality of track format regions.

7. The disk drive of claim 6 wherein the spoke identification circuit comprises:

a pseudorandom sequence generator to generate expected bits;

a compare gate fed by the spoke field bit provided from the plurality of said track format regions and by the expected bit generated by the pseudorandom sequence generator;

a match history register that receives the output of the compare gate; and a gate which receives the outputs of the match history register to determine when the match history register contains N consecutive bits in the matched state to indicate that the pseudorandom sequence generator contains a valid spoke identification value.

8. The disk drive of claim 6 further comprising a spoke verification circuit that verifies that spoke values read from the spoke number field of sequential ones of the plurality of track format regions correspond to the bits expected from the spoke number field.

9. The disk drive of claim 8 wherein the verification circuit comprises:

a pseudorandom sequence generator;

a compare gate that compares a value generated from the pseudorandom sequence generator with a value read from the spoke number field; and a match history register that receives the values from the compare gate and to shift said values into the match history shift register.

10. The disk drive of claim 9 further comprising:

a summing circuit to produce a sum of the number of mismatches in the match history shift register; and thresholding logic which compares the number of matches to a threshold to determine whether the spoke bits are valid.

11. The disk drive of claim 6 further comprising a spoke number generator that generates sequential numbers that directly indicate the order in which the spoke field regions occur on a track of the disk.

12. The disk drive of claim 6 further comprising a pseudorandom sequence generator to produce the single binary bit of the spoke field region for each of the plurality of track format regions.

13. The disk drive of claim 12 wherein the pseudorandom sequence generator comprises:

a linear feedback shift register comprising:

a shift register; and an exclusive OR gate coupled to a pair of outputs of a pair of stages of said shift register to produces a signal that is fed back to an input of said shift register.

\* \* \* \* \*